US009011237B2

(12) United States Patent
Sims

(10) Patent No.: US 9,011,237 B2

(45) Date of Patent: Apr. 21, 2015

(54) GAMING SYSTEM AND A METHOD OF GAMING

(75) Inventor: Scott Sims, Las Vegas, NV (US)

(73) Assignee: Aristocrat Technologies Australia Pty Limited (AU)

( * ) Notice: Subject to any disclaimer, the term of this patent is extended or adjusted under 35 U.S.C. 154(b) by 196 days.

(21) Appl. No.: 13/456,507

(22) Filed: Apr. 26, 2012

(65) Prior Publication Data

US 2012/0214573 A1 Aug. 23, 2012

Related U.S. Application Data

(63) Continuation of application No. 12/470,966, filed on May 22, 2009, now Pat. No. 8,187,080.

(60) Provisional application No. 61/055,736, filed on May 23, 2008.

(51) Int. Cl.

| | |
|---|---|
| ***A63F 9/24*** | (2006.01) |
| ***A63F 13/00*** | (2014.01) |
| ***G07F 17/00*** | (2006.01) |
| ***G07F 19/00*** | (2006.01) |
| ***G07F 17/32*** | (2006.01) |

(52) U.S. Cl.

CPC ............ *G07F 17/3244* (2013.01); *G07F 17/32* (2013.01); *G07F 17/3267* (2013.01)

(58) Field of Classification Search

CPC . G07F 17/3244; G07F 17/3267; G07F 17/34; G07F 17/3265

USPC ................................................ 463/20, 22, 25

See application file for complete search history.

(56) References Cited

U.S. PATENT DOCUMENTS

| | | | | |
|---|---|---|---|---|
| 5,401,024 | A * | 3/1995 | Simunek | 463/18 |
| 5,569,082 | A * | 10/1996 | Kaye | 463/17 |
| 5,704,835 | A * | 1/1998 | Dietz, II | 463/20 |
| 6,251,013 | B1 | 6/2001 | Bennett | |
| 6,551,187 | B1 | 4/2003 | Jaffe | |
| 6,910,962 | B2 * | 6/2005 | Marks et al. | 463/16 |
| 7,192,347 | B1 * | 3/2007 | Marks et al. | 463/20 |
| 7,252,589 | B1 * | 8/2007 | Marks et al. | 463/16 |
| 7,604,538 | B2 * | 10/2009 | Pacey | 463/20 |
| 7,749,063 | B2 * | 7/2010 | Belger et al. | 463/16 |
| 7,749,071 | B2 * | 7/2010 | Marks et al. | 463/20 |
| 8,574,061 | B2 * | 11/2013 | Marks et al. | 463/21 |
| 2001/0007828 | A1 * | 7/2001 | Walker et al. | 463/26 |

(Continued)

FOREIGN PATENT DOCUMENTS

| | | |
|---|---|---|
| AU | 200157973 | 2/2002 |
| AU | 200230167 B | 6/2002 |

(Continued)

*Primary Examiner* — Steven J Hylinski

(74) *Attorney, Agent, or Firm* — McAndrews, Held & Malloy, Ltd.

(57) ABSTRACT

A gaming system is disclosed which comprises a selector arranged to select a plurality of symbols from a set of symbols for display in a display area at a plurality of display positions, an outcome evaluator arranged to evaluate a game outcome based on the selected symbols and to identify a scatter outcome when a plurality of special symbols are disposed in the display area at any display position, and a prize allocator. The prize allocator is arranged to allocate a prize to a player when a scatter outcome exists and to determine the prize awarded to a player using the plurality of special symbols. A corresponding method is also disclosed.

26 Claims, 8 Drawing Sheets

(56) References Cited

U.S. PATENT DOCUMENTS

| | | | | |
|---|---|---|---|---|
| 2002/0025846 | A1 | 2/2002 | Bennett et al. | |
| 2002/0039920 | A1 | 4/2002 | Bryant | |
| 2002/0052233 | A1* | 5/2002 | Gauselmann | 463/20 |
| 2003/0157981 | A1* | 8/2003 | Marks et al. | 463/20 |
| 2004/0048646 | A1* | 3/2004 | Visocnik | 463/16 |
| 2005/0014557 | A1* | 1/2005 | Duhamel | 463/20 |
| 2005/0026677 | A1 | 2/2005 | Roukis | |
| 2005/0054414 | A1 | 3/2005 | Gauselmann | |
| 2005/0107154 | A1* | 5/2005 | Pacey | 463/20 |
| 2006/0068881 | A1 | 3/2006 | Casey | |
| 2006/0068883 | A1 | 3/2006 | Randall et al. | |
| 2007/0021187 | A1 | 1/2007 | Gauselmann | |
| 2007/0123338 | A1 | 5/2007 | Sato | |
| 2007/0254735 | A1* | 11/2007 | Marks et al. | 463/20 |
| 2008/0085760 | A1 | 4/2008 | Marks et al. | |
| 2009/0143131 | A1* | 6/2009 | Yoshizawa | 463/20 |
| 2009/0143132 | A1* | 6/2009 | Yoshizawa | 463/20 |
| 2010/0273550 | A1* | 10/2010 | Marks et al. | 463/20 |

FOREIGN PATENT DOCUMENTS

| | | |
|---|---|---|
| AU | 2003246036 | 4/2004 |
| AU | 2005218025 | 4/2006 |
| AU | 2006202210 | 6/2006 |
| AU | 2006202644 | 1/2007 |
| CA | 2399923 | 3/2003 |
| CA | 2441081 | 5/2004 |
| EP | 1063622 | 12/2000 |
| EP | 1150261 | 10/2001 |
| EP | 1418553 | 5/2004 |
| GB | 2401705 | 11/2004 |
| GB | 2402256 | 12/2004 |
| WO | 2005086018 | 9/2005 |

* cited by examiner

322

| Scatter combination | Win outcome |
|---|---|
| 3 Aces | 10 x stake |
| 2 Aces | 5 x stake |
| 3 WILD | 3 x stake & implement feature |
| Other outcome | 3 x stake |

GAMING SYSTEM AND A METHOD OF GAMING

RELATED APPLICATIONS

This application claims priority to, and is a continuation of, U.S. patent application Ser. No. 12/470,966 having a filing date of May 22, 2009, which is incorporated herein by reference, and which claims priority to U.S. Provisional Patent Application No. 61/055,736 having a filing date of May 23, 2008, which is also incorporated herein by reference in its entirety.

FEDERALLY SPONSORED RESEARCH OR DEVELOPMENT

[Not Applicable]

MICROFICHE/COPYRIGHT REFERENCE

[Not Applicable]

BACKGROUND OF THE INVENTION

The present invention relates to a gaming system and to a method of gaming.

It is known to provide a gaming system which comprises a game controller arranged to randomly display several selected symbols from a predetermined set of symbols in a display area and to determine a game outcome such as a game win based on the displayed symbols. Such gaming systems may commonly be implemented as a stepper machine provided with electro-mechanical reels with each reel carrying several symbols of the set, or a video machine wherein selected symbols are displayed on virtual reels on a graphical display device. Winning outcomes occur when selected symbols are disposed along a defined win line and the symbols correspond to a winning combination.

With some such gaming machines, a scatter winning outcome occurs when a defined combination of symbols is displayed at any location in the display area. The prize associated with this type of winning outcome is often an amount based on the total amount wagered multiplied by a particular number which may depend on the number of scatter symbols displayed in the winning outcome or may be a fixed amount.

However, while such gaming systems provide users with enjoyment, a need exists for alternative gaming systems in order to maintain or increase player enjoyment.

BRIEF SUMMARY OF THE INVENTION

In accordance with a first aspect of the present invention, there is provided a gaming system comprising:

a selector arranged to select a plurality of symbols from a set of symbols for display in a display area at a plurality of display positions;

an outcome evaluator arranged to evaluate a game outcome based on the selected symbols and to identify a scatter outcome when a plurality of special symbols are disposed in the display area at any display position; and a prize allocator;

wherein the prize allocator is arranged to allocate a prize to a player when a scatter outcome exists and to determine the prize awarded to a player using the plurality of special symbols.

In one embodiment, the prize allocator is configured to assign to each special symbol an integer and to determine the prize from said assigned integers.

In one embodiment, each special symbol is an integer and the prize allocator is arranged to determine the prize from said integers.

The integers may be combined together in order to define the prize, for example by concatenating the selected integers, by adding the selected integers together, or by multiplying the selected integers together.

In one embodiment, the combined integers define the quantum of the prize awarded to the player.

In an alternative embodiment, the gaming system is arranged to receive a stake and the combined integers represent a multiplication factor, the prize amount being derived by multiplying the stake by the multiplication factor.

In one embodiment, the selector is arranged to select a plurality of first symbols, the outcome evaluator is arranged to evaluate a game outcome based on the selected first symbols and to identify a scatter outcome when a plurality of special first symbols are disposed in the display area at any display position, the selector is arranged to select at least one second symbol, and the prize allocator is arranged to determine the prize awarded to a player using the second symbols.

In one embodiment, the gaming system is arranged such that each displayed combination of selected special symbols is associated with a prize which may be a win amount indicative of the amount of credits to be awarded to the player, or a multiplication factor, the prize amount being derived by multiplying the stake by the multiplication factor.

In one embodiment, the gaming system is arranged such that when a scatter outcome is identified, the selected second symbols are displayed at the display positions of the first symbols forming part of the scatter outcome.

In one embodiment, the prize is in the form of credits, or in the form of free games or progressive wins.

In addition, or alternatively, the prize is in the form of credits and implementation of a feature game. The feature game may be arranged to commence when a specific combination of special symbols are selected.

The set of symbols may include at least one function symbol having an associated function which may be a wild function, a scatter function, a multiplier function, a repeat win function or a jackpot function.

The gaming system may be implemented as a stand alone gaming machine or across a network.

In accordance with a second aspect of the present invention, there is provided a method of gaming comprising:

selecting a plurality of symbols from a set of symbols;

displaying the selected symbols in a display area at a plurality of display positions;

evaluating a game outcome based on the selected symbols;

identifying a scatter outcome when a plurality of special symbols are disposed in the display area at any display position;

selecting at least one second symbol and allocating a prize to a player when a scatter outcome exists; and determining the prize awarded to a player using the plurality of special symbols In accordance with a third aspect of the present invention, there is provided a computer program arranged when loaded into a computer to instruct the computer to operate in accordance with a gaming system comprising:

a selector arranged to select a plurality of symbols from a set of symbols for display in a display area at a plurality of display positions;

an outcome evaluator arranged to evaluate a game outcome based on the selected symbols and to identify a scatter outcome when a plurality of special symbols are disposed in the display area at any display position; and a prize allocator;

wherein the prize allocator is arranged to allocate a prize to a player when a scatter outcome exists and to determine the prize awarded to a player using the plurality of special symbols.

In accordance with a fourth aspect of the present invention, there is provided a computer readable medium having computer readable program code embodied therein for causing a computer to operate in accordance with a gaming system comprising:

a selector arranged to select a plurality of symbols from a set of symbols for display in a display area at a plurality of display positions;

an outcome evaluator arranged to evaluate a game outcome based on the selected symbols and to identify a scatter outcome when a plurality of special symbols are disposed in the display area at any display position; and a prize allocator;

wherein the prize allocator is arranged to allocate a prize to a player when a scatter outcome exists and to determine the prize awarded to a player using the plurality of special symbols.

In accordance with a fifth aspect of the present invention, there is provided a data signal having computer readable program code embodied therein for causing a computer to operate in accordance with a gaming system comprising:

a selector arranged to select a plurality of symbols from a set of symbols for display in a display area at a plurality of display positions;

an outcome evaluator arranged to evaluate a game outcome based on the selected symbols and to identify a scatter outcome when a plurality of special symbols are disposed in the display area at any display position; and a prize allocator;

wherein the prize allocator is arranged to allocate a prize to a player when a scatter outcome exists and to determine the prize awarded to a player using the plurality of special symbols.

BRIEF DESCRIPTION OF SEVERAL VIEWS OF THE DRAWINGS

The present invention will now be described, by way of example only, with reference to the accompanying drawings, in which.

DETAILED DESCRIPTION OF THE INVENTION

Figure 1:
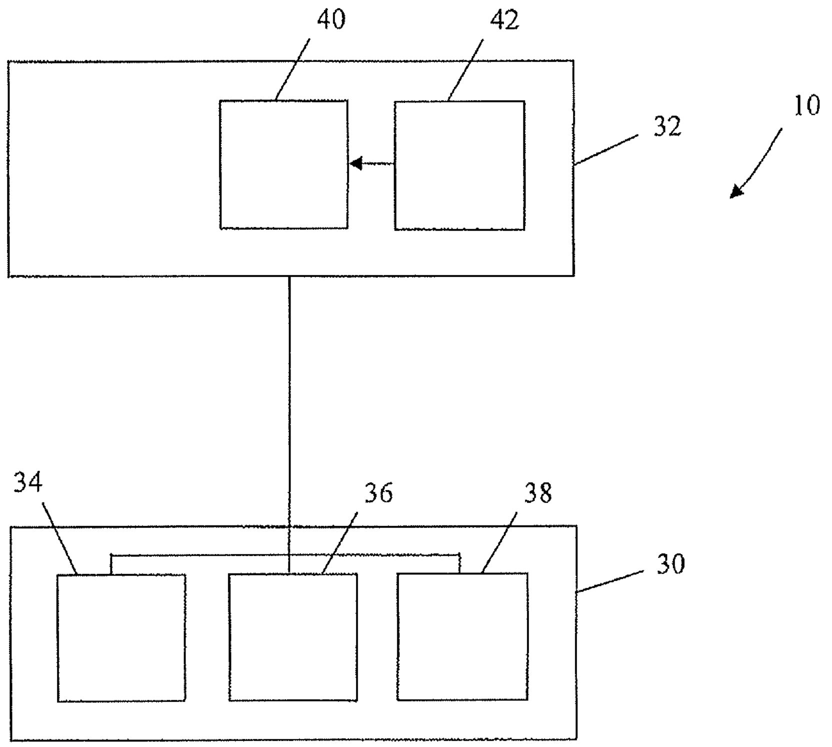
FIG. 1 is a schematic block diagram of core components of a gaming system in accordance with an embodiment of the present invention.

Referring to the drawings, there is shown a schematic block diagram of a gaming system 10 arranged to implement a probabilistic game of the type wherein several symbols from a set of symbols are randomly displayed, and a game outcome is determined on the basis of the displayed symbols. With some such probabilistic games, the set of symbols include standard symbols and function symbols, and the game outcome is determined on the basis of the displayed standard symbols and the function associated with any displayed function symbol. For example, standard symbols may resemble fruit such as apples, pears and bananas with a win outcome being determined when a predetermined number of the same fruit appear on a display in the same win line, scattered, and so on. The function associated with a function symbol may be for example a wild function wherein display of the function symbol is treated during consideration of the game outcome as any of the standard symbols. A function symbol may be represented as the word “WILD”, a star, or by any other suitable word or symbol. Other functions are also envisaged such as multiplier functions, repeat win functions, jackpot functions and feature commencement functions. The available win lines may be fixed, may be determined on the basis of the bet placed, or may be selectable by a player. With this type of probabilistic game known hitherto, the prize amount for a winning outcome occurring along a particular win line is based on the amount bet per line, and for a scatter winning outcome is based on the total bet amount.

The present gaming system operates such that at least during a portion of a game implemented by the gaming system, the prize awarded for a scatter winning outcome is variable such that the prize is determined using at least one selected symbol, which may be an existing symbol or an additional selected symbol. In this way, the prize awarded to a player for a scatter winning outcome is not predictable and player enjoyment is increased as a result.

In one implementation, the prize amount is based solely on one or more selected scatter symbols, for example a plurality of selected scatter symbols wherein each possible combination of selected scatter symbols corresponds to a prize amount, or based on symbols in the form of numbers, with the numbers concatenated or otherwise combined together, for example by adding or multiplying, to provide a prize amount.

In other implementations, the prize amount is based on the total stake multiplied by a factor determined using one or more selected scatter symbol.

Referring to FIG. 1, a schematic diagram of core components of a gaming system 10 is shown. The core components comprise a player interface 30 and a game controller 32. The player interface 30 is arranged to enable interaction between a player and the gaming system and for this purpose includes input/output components required for the player to enter instructions and play the game.

Components of the player interface 30 may vary but will typically include a credit mechanism 34 to enable a player to input credits and receive payouts, one or more displays 36 which may comprise a touch screen, and a game play mechanism 38 such as a button panel arranged to enable a player to input game playing instructions.

The game controller 32 is in data communication with the player interface 30 and typically includes a processor 40 arranged to process game play instructions and output game player outcomes to the display 36. Typically, the game play instructions are stored as program code in a memory 42 that can also be hardwired. It will be understood that in this specification the term "processor" is used to refer generically to any device that can process game play instructions and may include a microprocessor, microcontroller, programmable logic device or other computational device such as a personal computer or a server.

Figure 2:
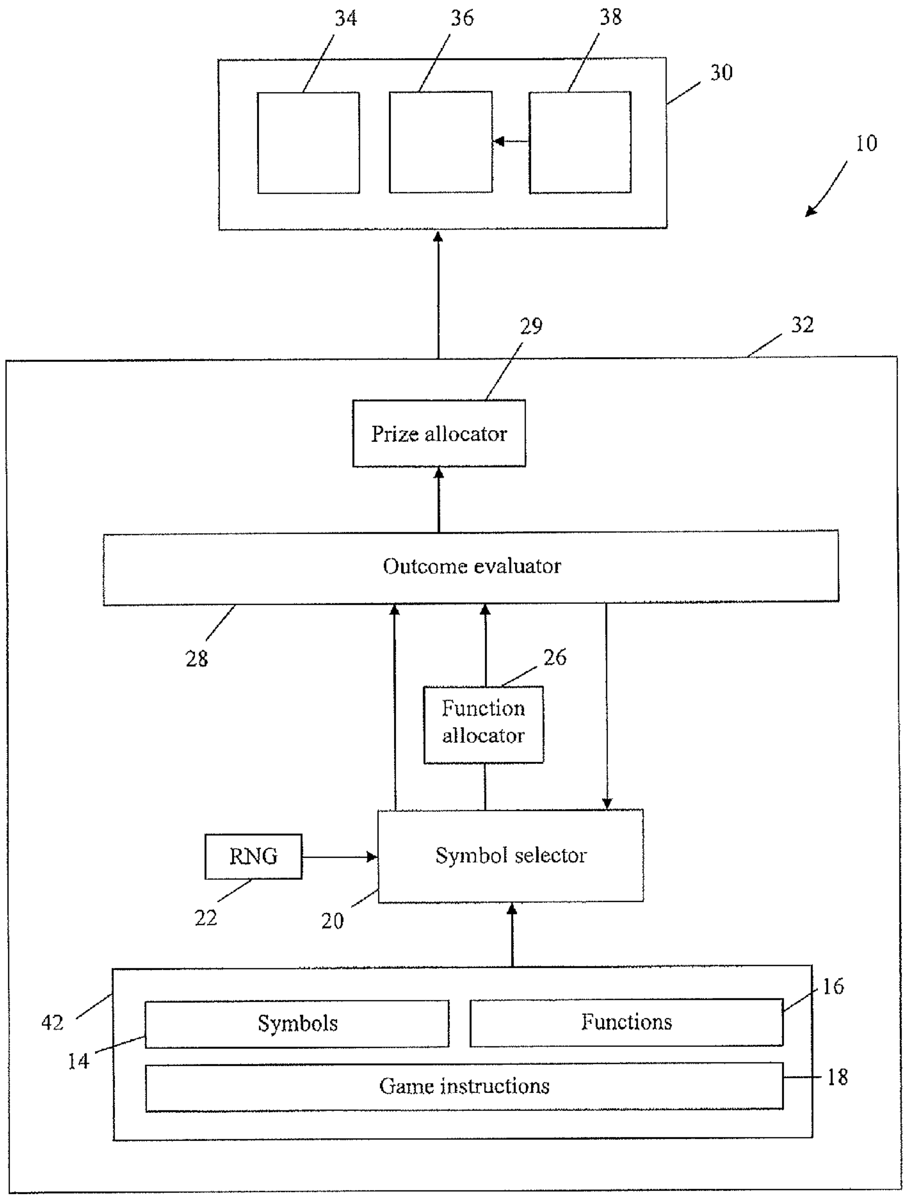
FIG. 2 is a schematic block diagram of functional components of a gaming system in accordance with an embodiment of the present invention.

A functional diagram illustrating operative components of the game controller 32 is shown in FIG. 2.

The memory 42 is arranged to store symbol data 14 indicative of the characteristics (e.g. appearance, number and arrangement relative to other symbols for example to represent a virtual reel strip) for each of a plurality of symbols for subsequent display to a player, function data 16 indicative of one or more functions allocatable to the symbols, and game instruction data 18 indicative of game instructions usable by the gaming machine 10 to control operation of the game.

The game controller 32 includes a symbol selector 20 which is arranged to randomly select several first symbols from the stored symbols 14 for display to a player. In this example, the selection carried out by the symbol selector 20 is made using a random number generator 22. The randomly selected symbols for each reel to be displayed (or for each position in the game display matrix) defines the outcome for at least the primary or base game.

It will be appreciated that the random number generator 22 may be of a type which is arranged to generate pseudo random numbers based on a seed number, and that in this specification the term "random" will be understood accordingly to mean truly random or pseudo random.

In this example, the game controller 32 also comprises a function allocator 26 arranged to allocate one or more functions to one or more selected symbols. Such functions include a wild function, but may indicate any other function which may be applied to a symbol or to the game.

The game controller 32 also comprises an outcome evaluator 28 which in accordance with the game instructions 18 determines game outcomes based on the first symbols selected for display to a player by the symbol selector 20. In this example, if a scatter winning outcome is identified, the symbol selector 20 selects at least one second symbol, such as an integer selected from a range of integers, which is then used by a prize allocator 29 to determine the prize awarded to the player. The at least one second symbol may be displayed in place of one or more of the scatter symbols defining the scatter outcome, or may be displayed elsewhere on the gaming system. The selected symbol(s) may be selected from a second set of symbols which is different to the first set of symbols, the same as the first set of symbols, or a subset of the first set of symbols.

In the embodiments described below, the symbol selector 20, the function allocator 26, the outcome evaluator 28 and the prize allocator 29 are at least partly implemented using the processor 40 and associated software, although it will be understood that other implementations are envisaged.

The gaming system 10 can take a number of different forms.

In a first form, a stand alone gaming machine is provided wherein all or most components required for implementing the game are present in a player operable gaming machine.

In a second form, a distributed architecture is provided wherein some of the components required for implementing the game are present in a player operable gaming device and some of the components required for implementing the game are located remotely relative to the gaming device. For example, a "thick client" architecture may be used wherein part of the game is executed on a player operable gaming terminal and part of the game is executed remotely, such as by a gaming server; or a "thin client" architecture may be used wherein most of the game is executed remotely such as by a gaming server and a player operable gaming terminal is used only to display audible and/or visible gaming information to the player and receive gaming inputs from the player.

However, it will be understood that other arrangements are envisaged. For example, an architecture may be provided wherein a gaming device is networked to a gaming server and the respective functions of the gaming device and the gaming server are selectively modifiable. For example, the gaming system may operate in stand alone gaming machine mode, "thick client" mode or "thin client" mode depending on the game being played, operating conditions, and so on. Other variations will be apparent to persons skilled in the art.

Figure 3:
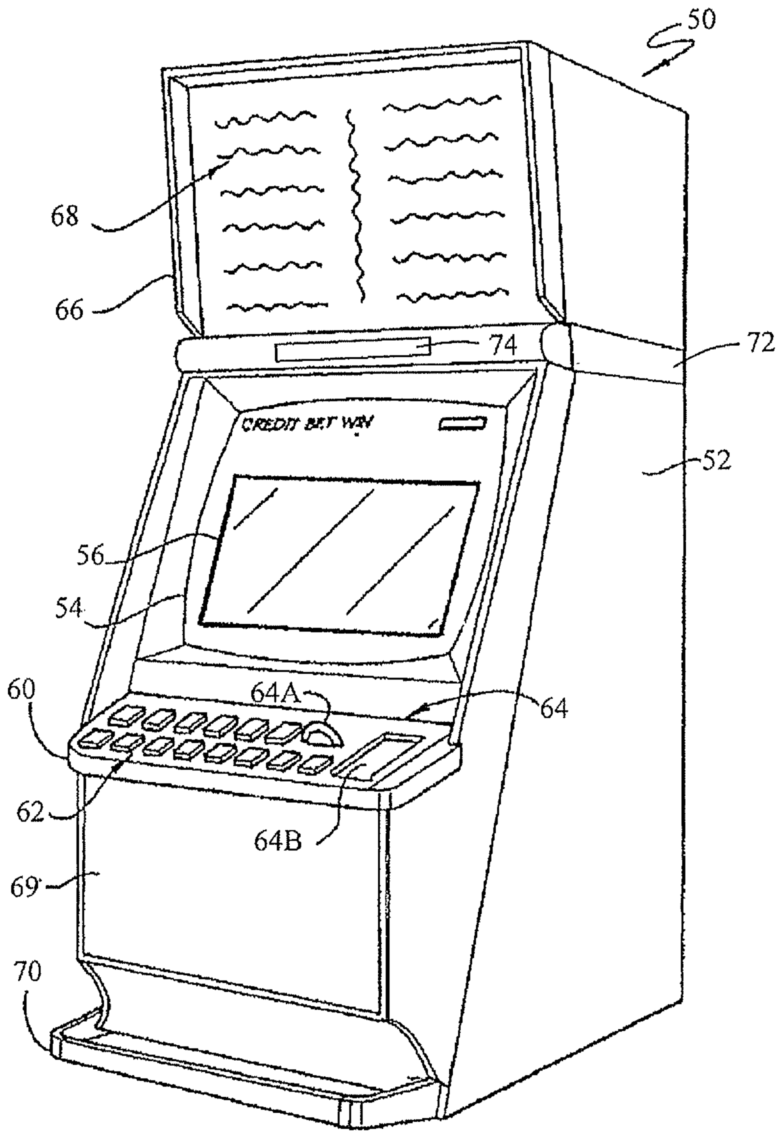
FIG. 3 is a diagrammatic representation of a gaming system in accordance with an embodiment of the present invention with the gaming system implemented in the form of a stand alone gaming machine.

A gaming system in the form of a stand alone gaming machine 50 is illustrated in FIG. 3. The gaming machine 50 includes a console 52 having a display 54 on which is displayed representations of a game 56 that can be played by a player. A mid-trim 60 of the gaming machine 50 houses a bank of buttons 62 for enabling a player to interact with the gaming machine, in particular during game play. The mid-trim 60 also houses a credit input mechanism 64 which in this example includes a coin input chute 64A and a bill collector 64B. Other credit input mechanisms may also be employed, for example, a card reader for reading a smart card, debit card or credit card.

A top box 66 may carry artwork 68, including for example pay tables and details of bonus awards and other information or images relating to the game. Further artwork and/or information may be provided on a front panel 69 of the console 52. A coin tray 70 is mounted beneath the front panel 69 for dispensing cash payouts from the gaming machine 50.

The display 54 is in the form of a video display unit, particularly a cathode ray tube screen device. Alternatively, the display 54 may be a liquid crystal display, plasma screen, or any other suitable video display unit. The display 54 could also be a clear window to view electro-mechanical stepper reels. The top box 66 may also include a display, for example a video display unit, which may be of the same type as the display 54, or of a different type. The display 54 may comprise a touch screen usable by a player to interact with the gaming machine, in particular during game play.

The display 54 in this example is arranged to display representations of several reels, each reel of which has several associated symbols. Typically 3, 4 or 5 reels are provided. During operation of the game, the reels first appear to rotate then stop with typically three symbols visible on each reel. Game outcomes are determined on the basis of the visible symbols together with any special functions associated with the symbols. These reels may be virtual as presented by a video display or may be electro-mechanical stepper reels.

A player marketing module (PMM) 72 having a display 74 is connected to the gaming machine 50. The main purpose of the PMM 72 is to allow the player to interact with a system provided player loyalty system. The PMM has a magnetic card reader for the purpose of reading a player tracking device, for example as part of a loyalty program. However other reading devices may be employed and the player tracking device may be in the form of a card, flash drive or any other portable storage medium capable of being read by the reading device. In this example, the PMM 62 is a Sentinel III device produced by Aristocrat Technologies Pty Ltd.

Figure 4:
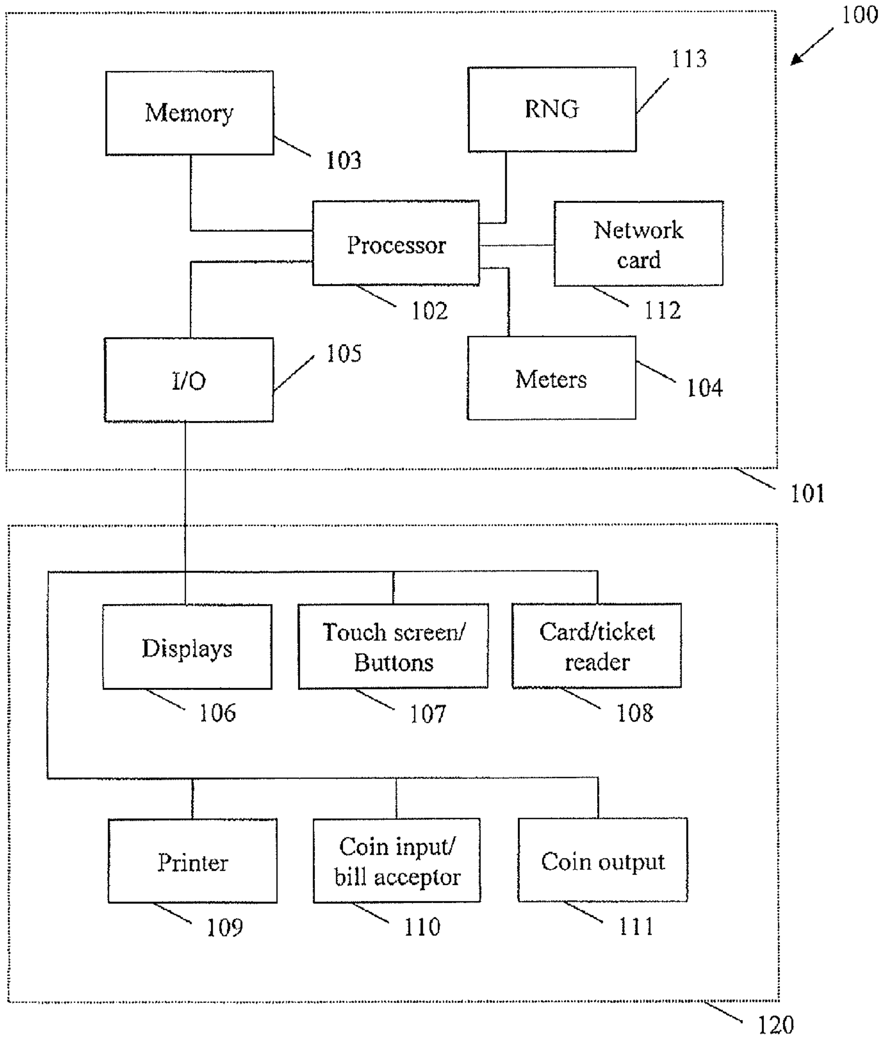
FIG. 4 is a schematic block diagram of operative components of the gaming machine shown in FIG. 3.

FIG. 4 shows a block diagram of operative components of a gaming device 100 which may be the same as or different to the gaming machine shown in FIG. 3.

The gaming device 100 includes a game controller 101 having a processor 102. Instructions and data to control operation of the processor 102 in accordance with the present invention are stored in a memory 103 which is in data communication with the processor 102.

Typically, the gaming device 100 will include both volatile and non-volatile memory and more than one of each type of memory, with such memories being collectively represented by the memory 103.

Figure 5:
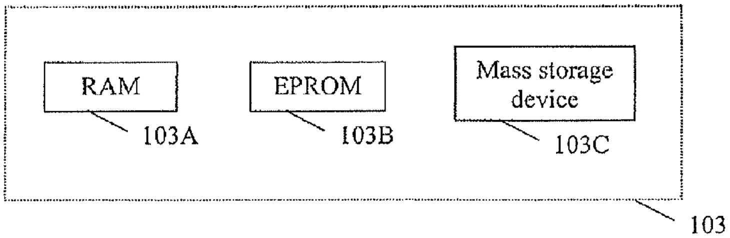
FIG. 5 is a schematic block diagram of components of a memory of the gaming machine shown in FIG. 3.

FIG. 5 shows a block diagram of the main components of an exemplary memory 103. The memory 103 includes RAM 103A, EPROM 103B and a mass storage device 103C. The RAM 103A typically temporarily holds program files for execution by the processor 102 and related data. The EPROM 103B may be a boot ROM device and/or may contain some system or game related code. The mass storage device 103C is typically used to store game programs, the integrity of which may be verified and/or authenticated by the processor 102 using protected code from the EPROM 103B or elsewhere.

The gaming device has hardware meters 104 for purposes including ensuring regulatory compliance and monitoring player credit, an input/output (I/O) interface 105 for communicating with a player interface 120 of the gaming device 100, the player interface 120 having several peripheral devices. The input/output interface 105 and/or the peripheral devices may be intelligent devices with their own memory for storing associated instructions and data for use with the input/output interface or the peripheral devices. A random number generator module 113 generates random numbers for use by the processor 102.

In the example shown in FIG. 4, the peripheral devices that communicate with the game controller 101 comprise one or more displays 106, a touch screen and/or bank of buttons 107, a card and/or ticket reader 108, a printer 109, a bill acceptor and/or coin input mechanism 110 and a coin output mechanism 111. Additional hardware may be included as part of the gaming machine 100, or hardware may be omitted as required for the specific implementation.

In addition, the gaming device 100 may include a communications interface, for example a network card 112. The network card may, for example, send status information, accounting information or other information to a central controller, server or database and receive data or commands from the central controller, server or database.

It is also possible for the operative components of the gaming device 100 to be distributed, for example input/output devices 106,107,108,109,110,111 may be provided remotely from the game controller 101.

Figure 6:
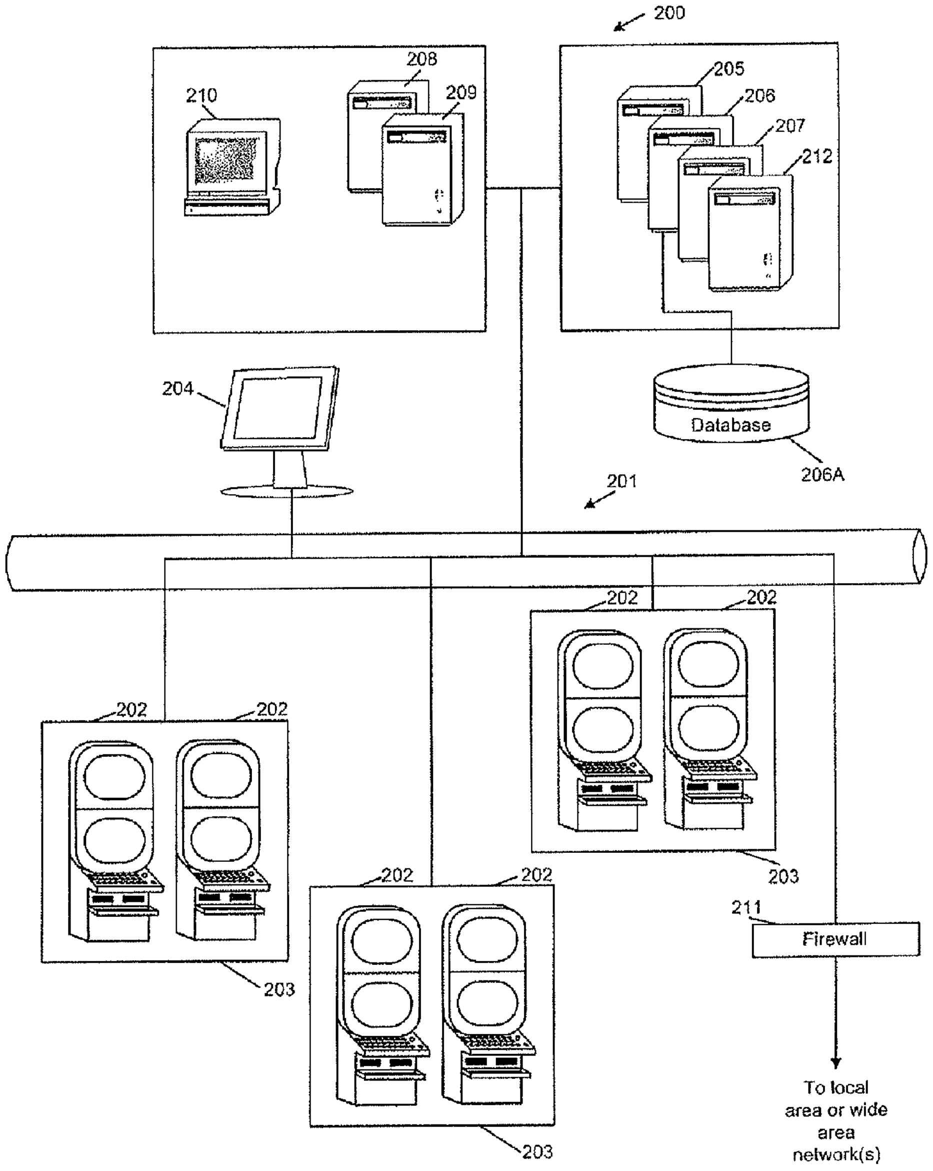
FIG. 6 is a schematic diagram of a gaming system in accordance with an alternative embodiment of the present invention with the gaming system implemented over a network.

FIG. 6 shows a gaming system 200 in accordance with an alternative embodiment. The gaming system 200 includes a network 201, which for example may be an Ethernet network, a LAN or a WAN. In this example, three banks 203 of two gaming devices 202 are connected to the network 201. The gaming devices 202 provide a player operable interface and may be the same as the gaming machines 40,100 shown in FIGS. 3 and 4, or may have simplified functionality depending on the requirements for implementing game play. While banks 203 of two gaming devices are illustrated in FIG. 6, banks of one, three or more gaming devices are also envisaged.

One or more displays 204 may also be connected to the network 201. The displays 204 may, for example, be associated with one or more banks 203 of gaming devices. The displays 204 may be used to display representations associated with game play on the gaming devices 202, and/or used to display other representations, for example promotional or informational material.

In a thick client embodiment, a game server 205 implements part of the game played by a player using a gaming device 202 and the gaming device 202 implements part of the game. With this embodiment, as both the game server 205 and the gaming device 202 implement part of the game, they collectively provide a game controller. A database management server 206 may manage storage of game programs and associated data for downloading or access by the gaming devices 202 in a database 206A. Typically, if the gaming system enables players to participate in a Jackpot game, a Jackpot server 207 will be provided to monitor and carry out the Jackpot game.

In a variation of the above thick client embodiment, the gaming device 202 is a gaming machine arranged to implement the game, with the game server 205 functioning merely to serve data indicative of a game to the gaming machine 202 for implementation.

With this implementation, a data signal containing a computer program usable by the gaming machine to implement the gaming system may be transferred from the game server to the client terminal, for example in response to a request by the gaming machine.

In a thin client embodiment, the game server 205 implements most or all of the game played by a player using a gaming terminal 202 and the gaming terminal 202 essentially provides only the player interface. With this embodiment, the game server 205 provides the game controller. The gaming terminal will receive player instructions, and pass the instructions to the game server which will process them and return game play outcomes to the gaming terminal for display. In a thin client embodiment, the gaming terminal could be computer terminals, e.g. PCs running software that provides a player interface operable using standard computer input and output components.

Servers are also typically provided to assist in the administration of the gaming system 200, including for example a gaming floor management server 208 and a licensing server 209 to monitor the use of licenses relating to particular games. An administrator terminal 210 is provided to allow an administrator to monitor the network 201 and the devices connected to the network.

The gaming system 200 may communicate with other gaming systems, other local networks such as a corporate network, and/or a wide area network such as the Internet, for example through a firewall 211.

A loyalty program server 212 may also be provided.

Persons skilled in the art will appreciate that in accordance with known techniques, functionality at the server side of the network may be distributed over a plurality of different computers. For example, elements may be run as a single "engine" on one server or a separate server may be provided. For example, the game server 205 could run a random number generator engine. Alternatively, a separate random number generator server could be provided.

During operation, the game controller, whether implemented in a stand alone gaming machine 10, 40, 100 or over a network 201, implements a probabilistic game wherein at least during part of the game the quantum of the prize awarded for a scatter winning outcome is determined using at least one additional selected symbol.

Examples of specific implementations of the gaming system will now be described in relation to a stand alone gaming machine 10, 40, 100 although it will be understood that implementation may also be carried out using other gaming system architectures such as a network architecture of the type shown in FIG. 6.

The present embodiment includes rotatable reels comprising standard symbols and optionally one or more function symbols. Win outcomes are determined on the basis of the symbols visible when the reels stop rotating, and in this example three symbols are displayed on each reel at any time. A win outcome may occur based on display of specific combinations of symbols along defined and wagered upon win lines which may extend horizontally, diagonally, or in any other predefined continuous line. A win outcome may also occur based on display of multiple symbols disposed at any display location on the display area. This latter type of win is often termed a "scatter" win. A win outcome may also occur on the basis of one or more standard symbols in combination with at least one function symbol having an assigned function. For example a function symbol may correspond to a wild function, a multiply function, a repeat win function, and so on.

Figure 7:
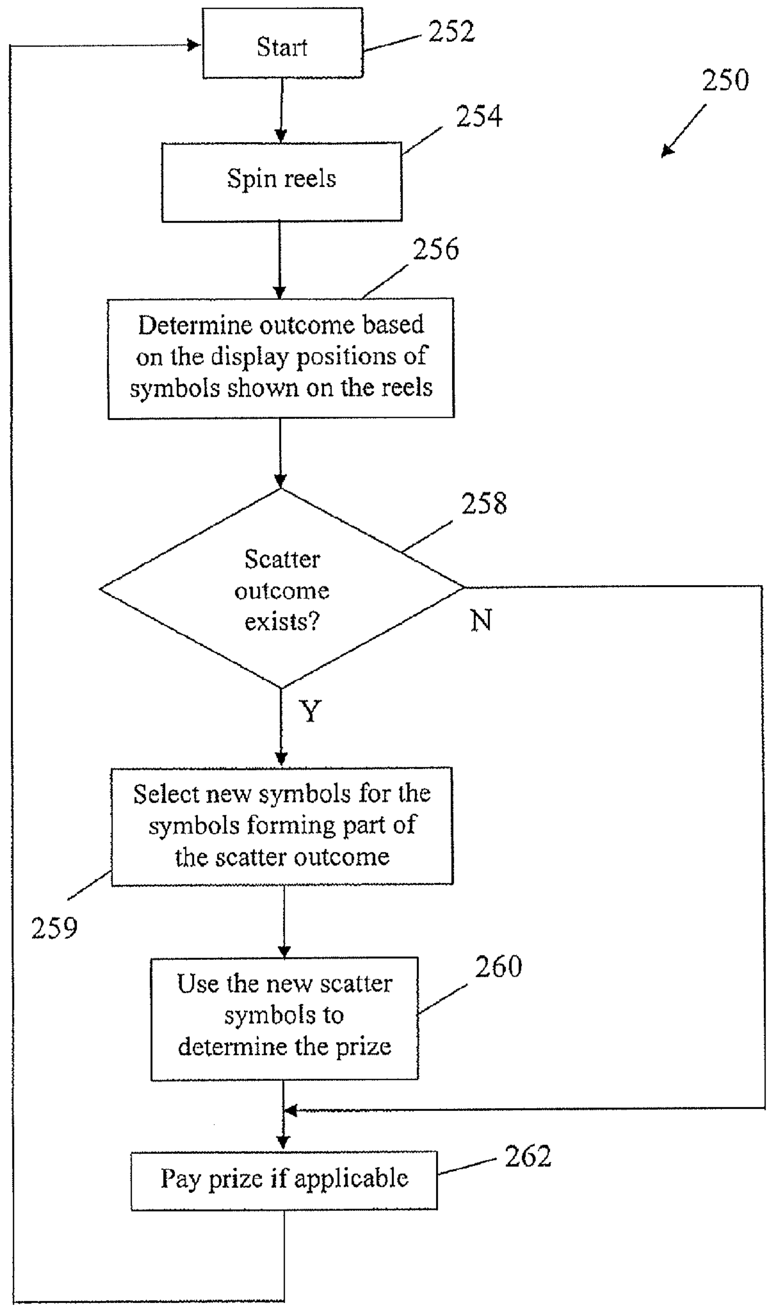
FIG. 7 is a flow diagram illustrating game play of a gaming system in accordance with an embodiment of the present invention.

A specific example will now be described in relation to flow diagram 250 shown in FIG. 7 which illustrates steps 252 to 262 of a method of gaming implemented by the gaming system.

In this example, five reels are provided, with each reel having multiple symbols. The reels are virtual reels and, as such, representations of the reels are displayed on a graphical display device 44. It is to be understood that as an alternative the reels could be electro-mechanical reels.

Figure 8:
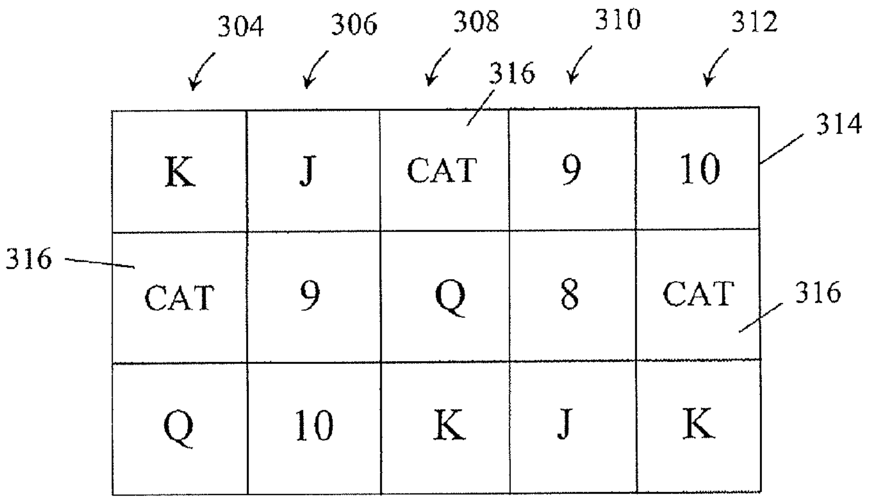
FIG. 8 is a diagrammatic representation of example first symbols shown in a display area of a gaming system according to an embodiment of a gaming system.

During implementation of a game, first, second, third, fourth and fifth reels 304, 306, 308, 310 and 312 rotate and the reels stop with three symbols displayed on each reel in a display area 314, as shown in FIG. 8.

The outcome evaluator 28 evaluates the symbols shown in the display area and if the display positions of the symbols correspond to a winning outcome a prize is awarded.

In the present embodiment, no winning symbol combination is disposed along any defined win line. However, 3 scattered CAT symbols 316 are present in the display area which corresponds to a scatter winning outcome.

Figure 9:
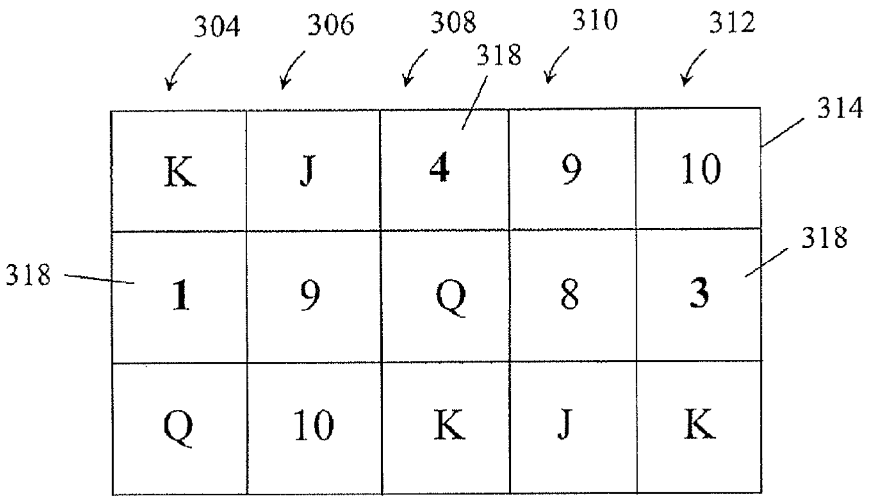
FIG. 9 is a diagrammatic representation of example first and second symbols shown in a display area according to the embodiment shown in FIG. 8.

The scatter winning outcome is recognized by the outcome evaluator 28 and based on this recognition the symbol selector 20 selects new symbols 318 for the scattered CAT symbols 316 to define an outcome, in this example the new symbols 318 being selected from a set of operators defined by integer numbers for a mathematical operation, as shown in FIG. 9. The numbers selected to associate with the scatter symbols may be randomly selected from a set of integers assigned to each reel. Table 1 below sets forth an example such table.

TABLE 1

| REEL 1 | REEL 2 | REEL 3 | REEL 4 | REEL 5 |
|---|---|---|---|---|
| 0, 1, 2 | 1, 2, 3, 4 | 1, 2, 3, 4 | 1, 2, 3, 4 | 1, 2, 3, 4 |

Thus, according to this embodiment the highest integer which could be selected to associate with 5 scatter symbols would be 24444 and the lowest would be, for 5 scatter symbols 01111. Depending upon which reels include the scatter symbols defining a winning combination, a random number generator selects an integer for each scatter symbol from the corresponding set of integers. It should be understood that other sets of integers could be used and the integers need not be consecutive. Further, the selection may include other operators or functions such as from integers or "WILD" symbols operating to create more winning combinations in the display, or multiplier operators to multiply winning outcomes, or operators representing the triggering of a secondary or feature game or a set of free spins. For example, one or more of the reels may have associated therewith a table of operators for random to pseudo-random selection.

The new symbols 318 are used to determine the prize to be awarded to a player for obtaining the scatter winning outcome shown in FIG. 8. In this example, the prize is determined by concatenating the numbers from left to right to provide a prize of 143 credits. However, it will be understood that other arrangements are possible. For example, the numbers may be added or multiplied together to provide a prize amount; the numbers may be combined such as by concatenation, adding or multiplication and multiplied by the stake to provide a prize amount; or the new symbols may be used in association with a lookup table containing all possible new symbol combinations, and prize amounts or win multipliers associated with the new symbol combinations.

Figures 10, 11:
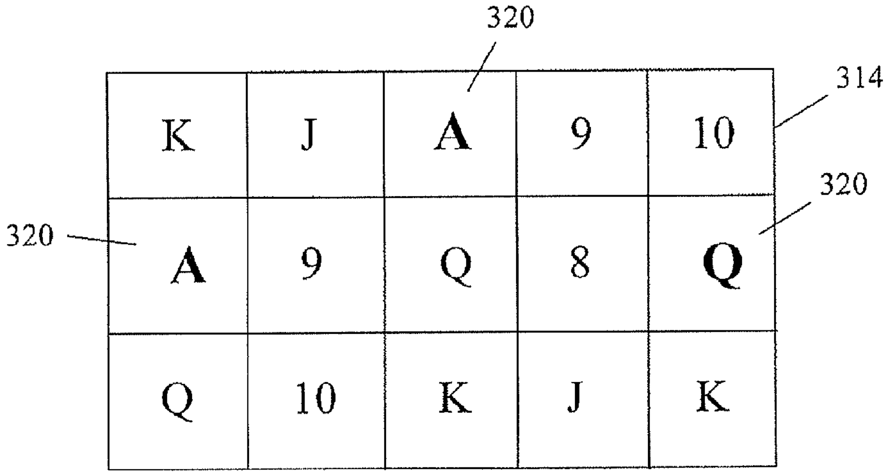
FIG. 10 is a diagrammatic representation of alternative example first and second symbols shown in a display area according to the embodiment shown in FIG. 8.
FIG. 11 is a diagrammatic representation of a pay table of the embodiment shown in FIG. 10.

A variation of the present gaming system is shown in FIG. 10. Like and similar features are indicated with like reference numerals. With this embodiment, instead of selecting new symbols from a set of numbers, the new symbols are selected from a set of graphical symbols and the selected new symbols 320 used in association with a lookup table containing all possible new symbol combinations and prize amounts or win multipliers associated with the symbol combinations. For example, as shown in a lookup table 322 in FIG. 11, if the selected new symbols correspond to 3 ACE symbols, the prize awarded is equal to the stake multiplied by 10. In the present example, the new symbols include 2 ACE symbols, so the prize awarded is equal to the stake multiplied by 5.

The combination displayed after selection of the new symbols may also be used to implement other aspects of the game. For example, as shown in the lookup table in FIG. 11, if the selected new symbols 320 include 3 WILD symbols, the prize awarded is equal to the stake multiplied by 3 and a feature game is also implemented.

It will be appreciated that although the prizes described above are in the form of credits, other types of prizes are envisaged. For example, prizes in the form of free games or progressive wins may be awarded, with the number of free games being determined by reference to the new symbols selected by the symbol selector 20.

In this example, the second symbols are selected from a single second set of symbols which is different to the first set of symbols. However, it will be understood that other arrangements are possible. For example, each reel or each displayed symbol forming part of a scatter outcome may be associated with a different second set of symbols from which a second symbol is selected.

In a further alternative arrangement, instead of selecting new symbols when a scatter outcome is identified, the characteristics of the prize awarded to a player for obtaining the winning outcome may be determined using the scatter symbols themselves. For example, the symbols may include a set of numbers which are designated as scatter symbols such that 3 or more numbers appearing on the display area constitute a winning scatter outcome, and the numbers used to define the prize, for example by combining the numbers together such as by concatenation, adding or multiplication.

In the claims of this application and in the description of the invention, except where the context requires otherwise due to express language or necessary implication, the words "comprise" or variations such as "comprises" or "comprising" are used in an inclusive sense, i.e. to specify the presence of the stated features but not to preclude the presence or addition of further features in various embodiments of the invention.

It is to be understood that, if any prior art publication is referred to herein, such reference does not constitute an admission that the publication forms a part of the common general knowledge in the art, in Australia or any other country.

Modifications and variations as would be apparent to a skilled addressee are deemed to be within the scope of the present invention.

The invention claimed is:

1. A gaming system comprising:

a selector configured to select a plurality of symbols from a set of symbols for display in a display area at a plurality of display positions arranged in a plurality of groups of display positions, and each said group being associated with a set of new symbols;

an outcome evaluator configured to evaluate a game outcome based on the selected symbols and to identify a scatter outcome when a plurality of special symbols are disposed in the display area at any display position;

a random number generator configured to select a new symbol from the associated set of new symbols in response to each of said group having a said special symbol disposed in said display area, and to replace each of said special symbols with a said selected new symbol; and a prize allocator configured (1) to allocate a prize to a player when a scatter outcome exists and to determine the allocated prize using the new symbols that have replaced the plurality of special symbols, (2) to assign to each new symbol an integer, (3) to determine the allocated prize from said assigned integers, (4) to combine the assigned integers together in order to define the characteristics of the allocated prize, and (5) wherein to combine together the assigned integers by one of concatenating the assigned integers, by adding the assigned integers together, or by multiplying the assigned integers together.

2. A gaming system as claimed in claim 1, wherein each new symbol is an integer and the prize allocator is configured to determine the prize from said integers.

3. A gaming system as claimed in claim 1, wherein the combined integers define the quantum of the allocated prize.

4. A gaming system as claimed in claim 1, wherein the gaming system is arranged to receive a stake and the combined assigned integers represent a multiplication factor, the amount of the allocated prize being derived by multiplying a stake by a multiplication factor.

5. A gaming system as claimed in claim 1, wherein the selector is configured to select a plurality of first symbols, the outcome evaluator is configured to evaluate a game outcome based on the selected first symbols and to identify a scatter outcome when a plurality of special first symbols are disposed in the display area at any display position, the selector is configured to select at least one second symbol, and the prize allocator is configured to determine the allocated prize using the selected at least one second symbol.

6. A gaming system as claimed in claim 5, wherein the first symbols are selected from a first set of symbols and the at least one second symbol is selected from a second set of symbols different to the first set of symbols.

7. A gaming system as claimed in claim 5, wherein the gaming system is configured such that when a scatter outcome is identified, the selected at least one second symbol is displayed at the display positions of the symbols forming part of the scatter outcome.

8. A gaming system as claimed in claim 1, wherein the gaming system is configured such that each displayed combination of selected new symbols is associated with a prize characteristic which may be (1) a win amount indicative of the amount of credits of the allocated prize, or (2) a multiplication factor and wherein the amount of the allocated prize being derived by multiplying a stake by a multiplication factor.

9. A gaming system as claimed in claim 1, wherein the allocated prize is in the form of credits, or in the form of free games, or in the form of play of a feature game or in the form of progressive wins.

10. A gaming system as claimed in claim 1, wherein the prize is in the form of credits and an implementation of a feature game.

11. A gaming system as claimed in claim 10, wherein the feature game is configured to commence when a specific combination of special symbols is selected.

12. A gaming system as claimed in claim 1, wherein the set of symbols includes at least one function symbol having an associated function.

13. A gaming system as claimed in claim 1, wherein the gaming system comprises a gaming machine.

14. A gaming system as claimed in claim 1, comprising a gaming terminal; and a gaming server in networked communication with the gaming terminal.

15. A method of gaming for use with a gaming system having a controller and a display, the method comprising:

selecting via the controller a plurality of symbols from a set of symbols;

displaying the selected symbols in a display area at a plurality of display positions arranged in a plurality of groups of display positions, and each said group being associated with a set of new symbols;

evaluating a game outcome based on the selected symbols;

identifying a scatter outcome when a plurality of special symbols are disposed in the display area at any display position;

selecting a new symbol from the associated set of new symbols, each new symbol being an integer, in response to each of said group having a said special symbol disposed in said display area;

replacing each of said special symbols with said selected new symbol;

allocating a prize to a player when a scatter outcome exists; and determining the prize awarded to a player using the integers of each of the new symbols that have replaced the plurality of selected special symbols;

combining the integers together in order to define the characteristics of the prize; and combining the integers together by concatenating the integers, by adding the integers together, or by multiplying the integers together.

16. A method as claimed in claim 15, comprising assigning an integer to each new symbol and determining the prize from said assigned integers.

17. A method as claimed in claim 15, wherein the combined integers define the quantum of the prize awarded to the player.

18. A method as claimed in claim 15, wherein the combined integers represent a multiplication factor, and further comprising receiving a stake and deriving the prize amount by multiplying the stake by the multiplication factor.

19. A method as claimed in claim 15, comprising selecting a plurality of first symbols, evaluating a game outcome based on the selected first symbols and identifying a scatter outcome when a plurality of special first symbols are disposed in the display area at any display position, selecting at least one second symbol, and determining the prize awarded to a player using the selected second symbols.

20. A method as claimed in claim 19, comprising selecting the first symbols are selected from a first set of symbols and selecting the second symbols from a second set of symbols different to the first set of symbols.

21. A method as claimed in claim 19, comprising displaying the selected special symbols at the display positions of the symbols forming part of the scatter outcome when a scatter outcome is identified.

22. A method as claimed in claim 15, comprising associating each displayed combination of selected special symbols with a prize.

23. A method as claimed in claim 15, wherein the prize is in the form of credits.

24. A method as claimed in claim 15, wherein the prize is in the form of free games or progressive wins.

25. A method as claimed in claim 15, wherein the prize is in the form of credits and implementation of a feature game.

26. A method as claimed in claim 25, comprising commencing the feature game when a specific combination of special symbols is selected.

* * * * *